(12) United States Patent
Muraki et al.

(10) Patent No.: US 6,220,383 B1
(45) Date of Patent: Apr. 24, 2001

(54) ELECTRIC POWER UNIT

(75) Inventors: Toshihiko Muraki, Kariya; Yuichi Shirota, Anjo; Teruhiko Kameoka, Okazaki; Kazutoshi Kuwayama, Nakashima-gun; Tetsuya Takechi, Kariya; Hikaru Sugi, Nagoya; Tokuhisa Takeuchi, Chita-gun; Mineo Yamaguchi, Obu; Yasushi Ueda; Hideyuki Takahashi, both of Toyohashi, all of (JP)

(73) Assignees: Denso Corporation; Asmo Co., Ltd., both of Kariya (JP)

( * ) Notice: Subject to any disclaimer, the term of this patent is extended or adjusted under 35 U.S.C. 154(b) by 0 days.

(21) Appl. No.: 09/149,100

(22) Filed: Sep. 8, 1998

(30) Foreign Application Priority Data

Oct. 13, 1997 (JP) .................................................. 9-279097
Oct. 13, 1997 (JP) .................................................. 9-279100
Dec. 3, 1997 (JP) .................................................. 9-333140

(51) Int. Cl.[7] .................................................. B60R 16/04
(52) U.S. Cl. .................................................. 180/68.5; 454/105
(58) Field of Search .................................................. 180/65.1, 68.1, 180/68.2, 68.5; 276/24.1, 208, 37.1; 454/105, 112, 117; 416/170 R; 417/420, 423.8

(56) References Cited

U.S. PATENT DOCUMENTS

| | | | |
|---|---|---|---|
| 2,937,803 | * 5/1960 | Cunningham | 417/420 |
| 3,229,896 | * 1/1966 | Levy | 417/423.8 |
| 3,860,064 | * 1/1975 | Murphy | 417/420 |
| 4,216,839 | * 8/1980 | Gould et al. | 180/65.1 |
| 4,283,067 | * 8/1981 | Weber et al. | 180/68.1 |
| 4,362,208 | * 12/1982 | Hauser | 180/68.1 |
| 5,392,873 | * 2/1995 | Masuyama et al. | 180/68.5 |
| 5,490,572 | * 2/1996 | Tajiri et al. | 180/68.2 |
| 5,620,057 | * 4/1997 | Klemen et al. | 180/68.5 |
| 5,690,519 | * 11/1997 | Chen | 417/420 |

FOREIGN PATENT DOCUMENTS

| | | | |
|---|---|---|---|
| 2640400 | * 3/1977 | (DE) | 180/68.5 |
| 4-24185 | * 1/1992 | (JP) | 180/68.5 |
| 6-1994 | * 1/1994 | (JP) | 180/68.5 |

* cited by examiner

Primary Examiner—Frank Vanaman
(74) Attorney, Agent, or Firm—Pillsbury Winthrop LLP (57) ABSTRACT

An electric power unit is composed of a secondary battery, a cooling fan, a fan motor and a case for the secondary battery, the cooling fan and the fan motor. The case has a partition for isolating the fan motor from the secondary battery and cooling fan. A magnetic joint is disposed between the motor and the cooling fan.

5 Claims, 6 Drawing Sheets

ELECTRIC POWER UNIT

CROSS REFERENCE TO RELATED APPLICATION

The present application is based on and claims priority from Japanese Patent Applications Hei 9-279097 filed on Oct. 13, 1997, Hei 9-279100 filed on Oct. 13, 1997 and Hei 9-333140 filed on Dec. 3, 1997, the contents of which are incorporated herein by reference.

BACKGROUND OF THE INVENTION

1. Field of the Invention

The present invention relates to an electric power unit for a hybrid car having an engine, a drive motor and a secondary battery.

2. Description of the Related Art

Because a secondary battery for a hybrid car generates much heat when it is charged, a motor-driven cooling fan is necessary to cool the secondary battery.

When the cooling fan operates, dust may enter the inside of the fan motor and cause various troubles. The fan motor, which generates heat by itself, is heated by the secondary battery, thereby causing deterioration of insulation members of the fan motor.

SUMMARY OF THE INVENTION

The present invention has an object of providing an improved reliable electric power unit without increase in the production cost.

According to a main aspect of the present invention, in an electric power unit composed of a secondary battery, a cooling fan for cooling the secondary battery, a fan motor for driving the cooling fan and a case, a partition is provided for isolating the fan motor from the secondary battery and cooling fan.

The above electric power unit may have a magnetic joint disposed between the motor and the cooling fan. The magnetic joint preferably includes an input member having a plurality of permanent magnet members and an output member having a plurality of permanent magnets disposed to oppose the permanent magnet of the input member. The partition is preferably disposed between the input member and the output member of the magnetic joint.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
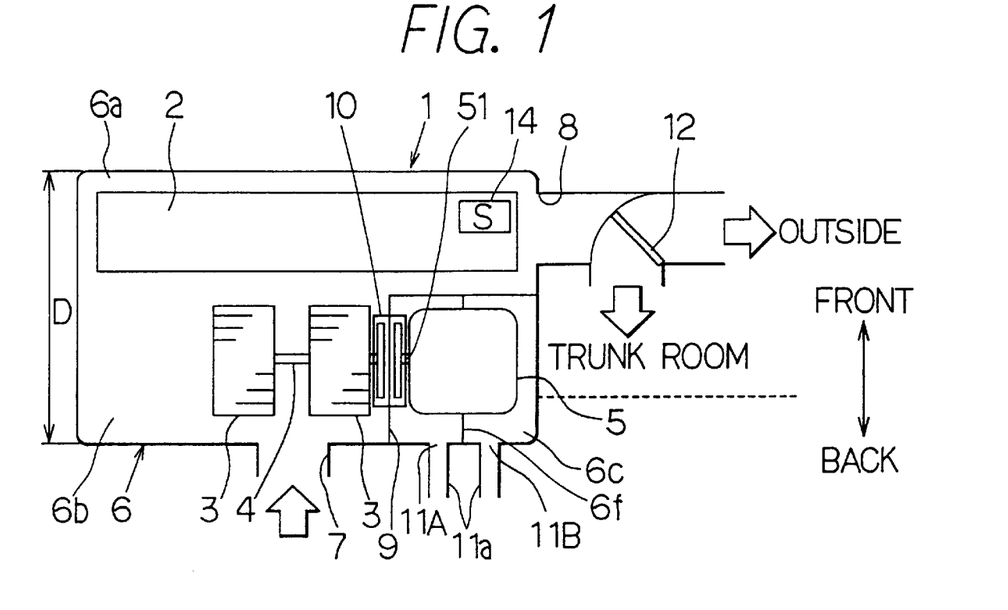
FIG. 1 is a schematic view of a power unit according to a preferred embodiment of the invention.
Figure 2:
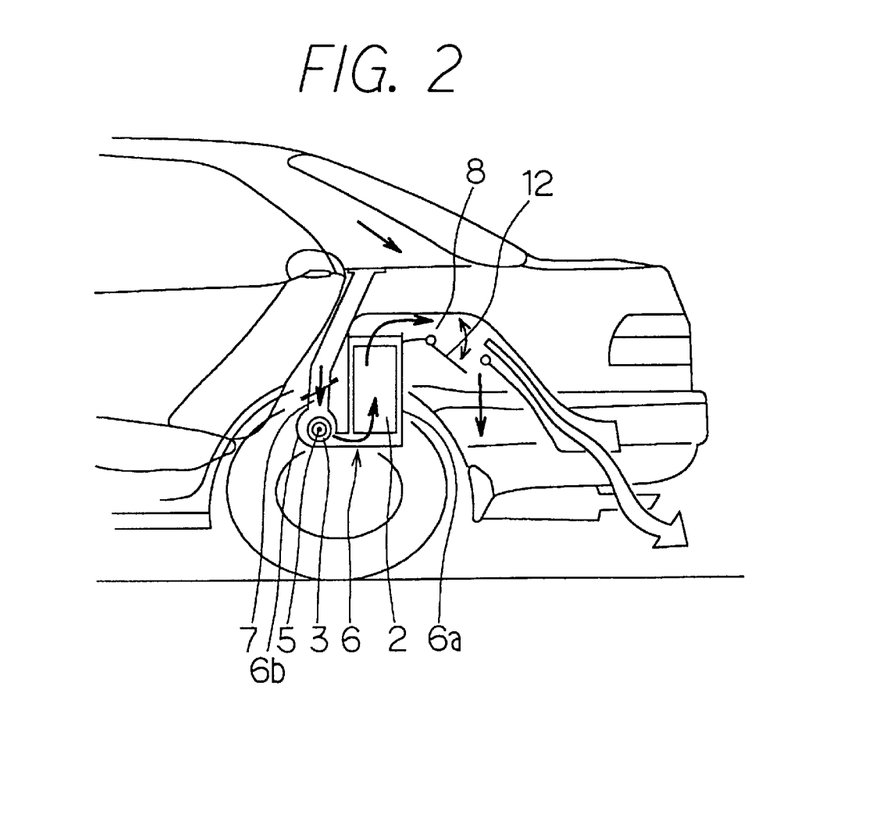
FIG. 2 is a schematic view illustrating the power unit according to the embodiment mounted in a hybrid car.
Figure 3:
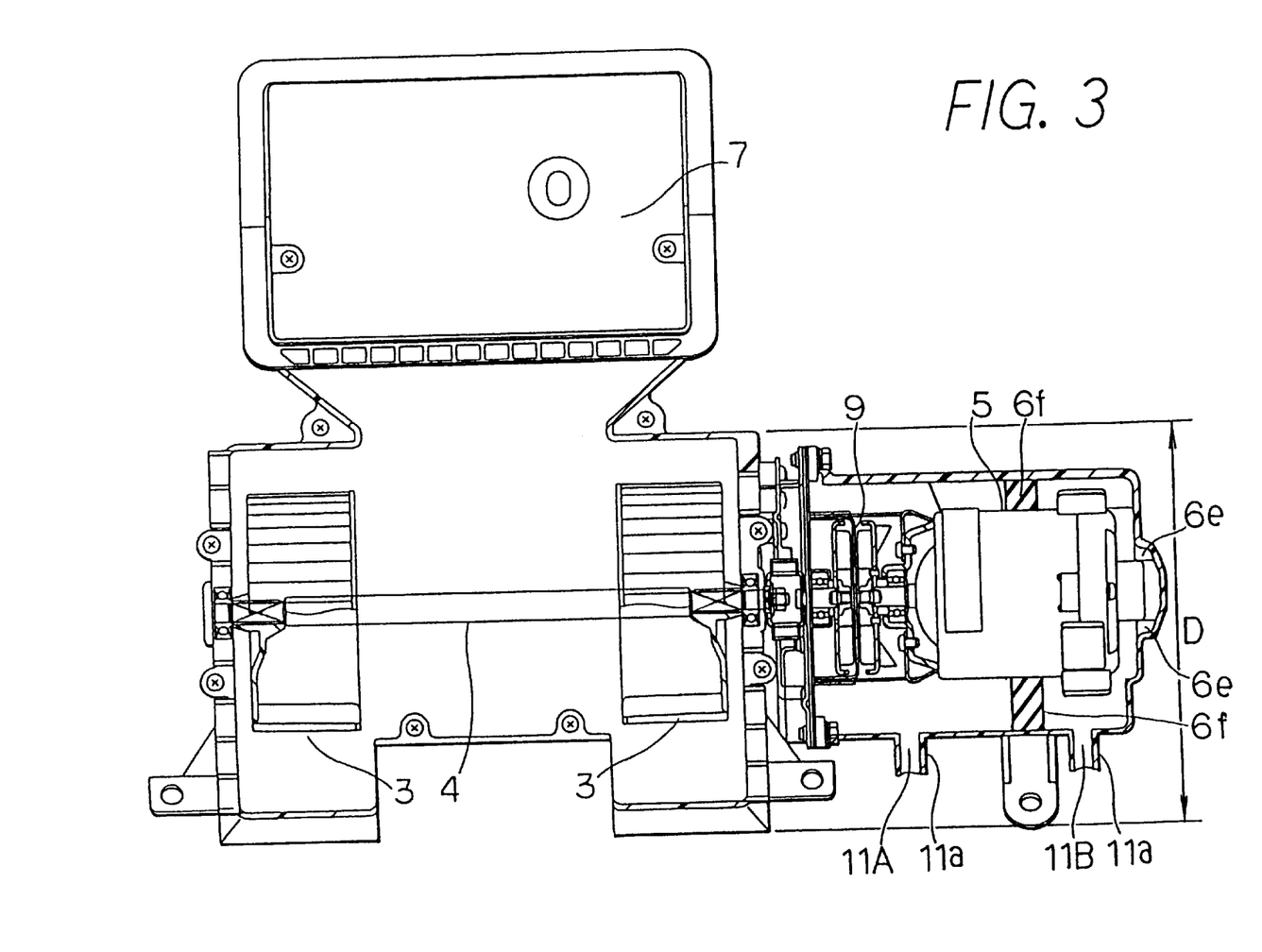
FIG. 3 is a cross-sectional plan view of the power unit.

In FIGS. 1–3, power unit 1 is disposed in case 6 which is mounted in a rear portion of a hybrid car. Power unit 1 is composed of secondary battery 2, a pair of cooling fans 3, fan motor 5 and magnetic joint 10. Secondary battery 2 is composed of nickel-hydrogen cells. The pair of cooling fans 3, magnetic joint 10 and fan motor 5 are linked in a line transverse to the car to reduce longitudinal size D shown in FIG. 1. The pair of cooling fans 3 is connected by a shaft 4 and driven by fan motor 5 through magnetic joint 10. Fan motor 5 is isolated from the pair of cooling fans 3 by a non-magnetic partition 9.

Figure 4A:
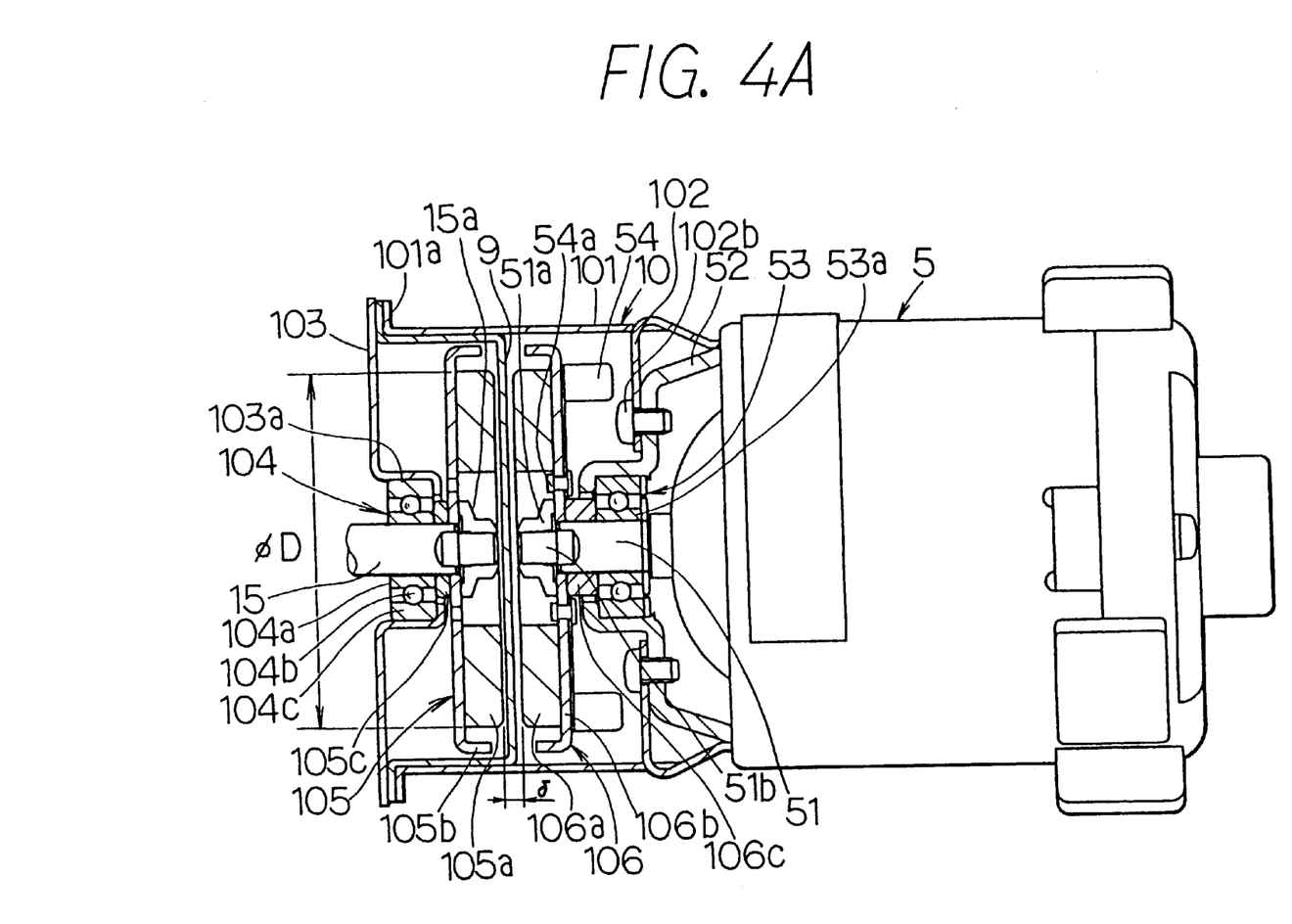
FIG. 4A is a fragmentary cross-sectional view and FIG. 4B is an exploded view of the fan motor.
Figure 4B:
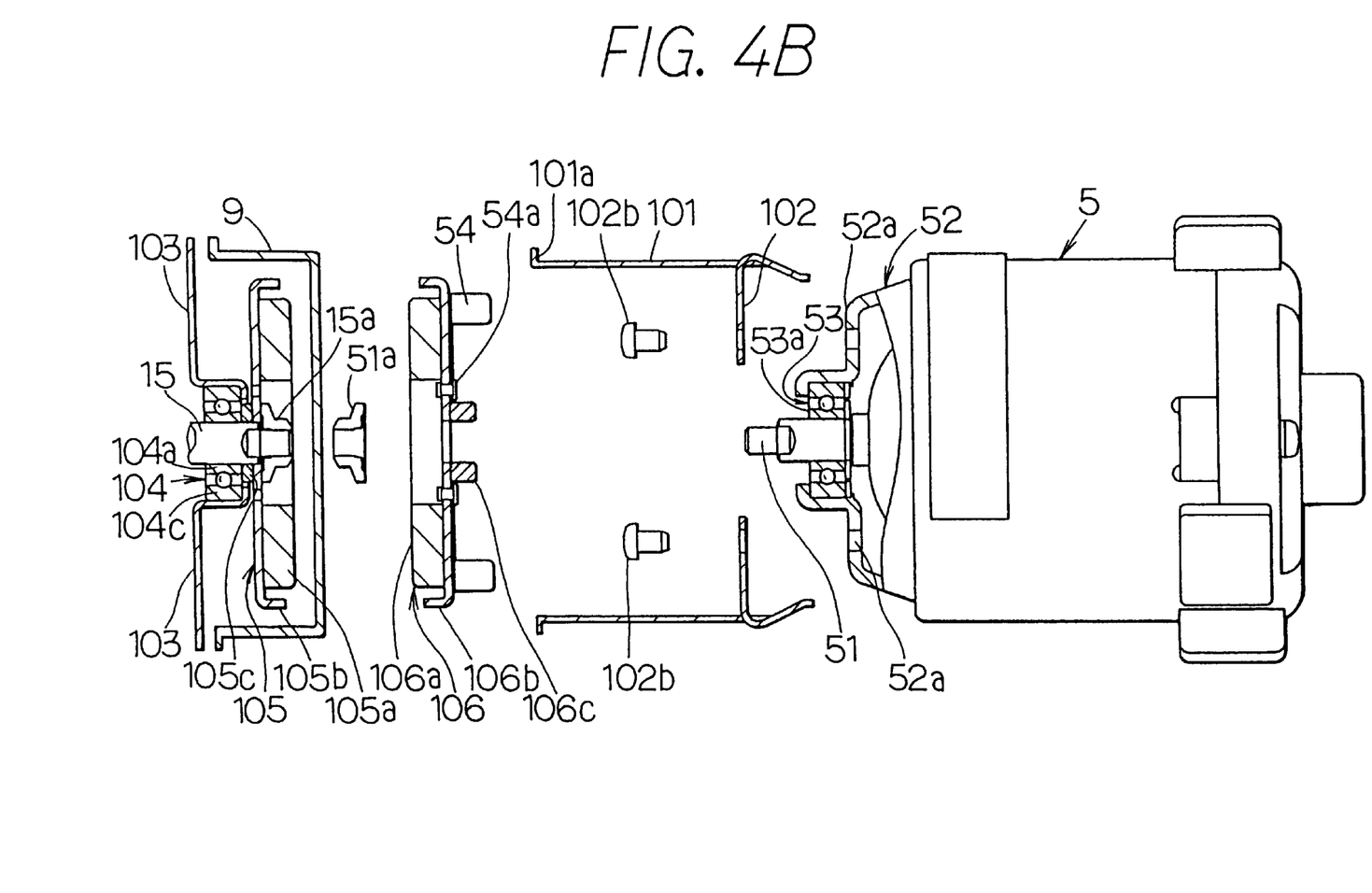

As shown in FIGS. 4A, and 4B, magnetic joint 10 is composed of cylindrical housing 101, rear frame 102, front frame 103, non-magnetic partition 9, bearing 104 held at the center of front frame 103, output member 105 connected to the pair of cooling fans 3 and input member 106 connected to motor shaft 54. Cylindrical housing 101 is made of non-magnetic material such as stainless steel and fixed to yoke housing 52 of the fan motor 5 via rear frame 102.

Front frame 103 is made of non-magnetic material such as stainless steel and fixed to the front end 101a of cylindrical housing 101 with the front end of non-magnetic partition 9. Non-magnetic partition 9 is disposed between input member 106 and output member 105 to interrupt transmission of heat from secondary battery 2 to fan motor 5 and to shut out dust introduced by the pair of cooling fans 3.

Figure 5:
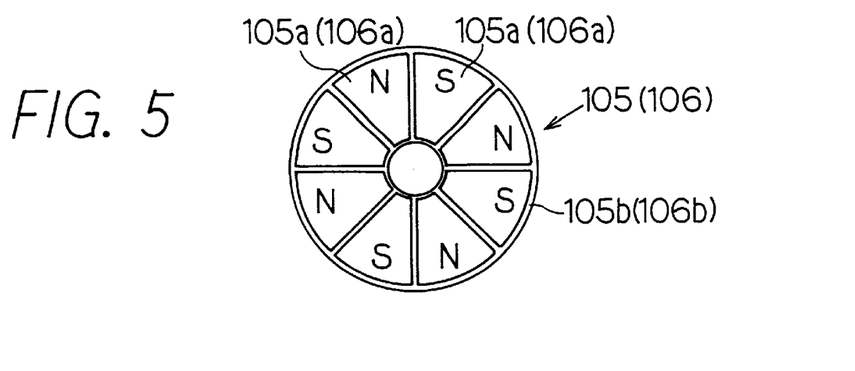
FIG. 5 is a schematic view of input and output members of the magnetic joint.

Each of output member 105 and input member 106 has a plurality of fan-shaped permanent magnet members 105a, 106a disposed circumferentially on disk plate 105b, 106b made of magnetic material so that the magnetic polarity thereof changes alternately as shown in FIG. 5. Front frame 103 has center concave 103a having a bottom member disposed between ball bearing 104 and disk plate 105b of output member 105 to retain ball bearing 104 from moving right (in FIG. 4A) under magnetic pulling force formed by output member 105 and input member 106.

Output member 105 has output shaft 15 supported by ball bearing 104, brass collar 105c disposed between inside ring 104a of ball bearing 104 and disk plate 105b. Output shaft 15 has a flat cut portion (not shown) on the periphery thereof and is inserted into a cut formed in the center of disk plate 105b to be locked thereby. Output shaft 15 is fastened to disk plate 105b by nut 15a. Thus, output member 105 is portioned by front frame 103 in the axial direction. Output shaft 15 is press-fitted to inside ring 104a of ball bearing 104. Outside ring 104c of bearing 104 is loose-fitted to center concave 103a of front frame 103.

Input member 106 has a plurality of fan blades 54 for supplying cooling air to fan motor 5. Input member 106 is driven by motor shaft 51 of fan motor 5 which is supported by bearing 53. Bearing is held by yoke housing 52 of fan motor 5. Motor shaft 51 has a flat cut portion (not shown) on the outer periphery thereof and external screw thread at the tip 51b thereof. Motor shaft 51 is inserted into a cut formed in the center of disk plate 106b to be locked thereby and is fastened to disk plate 106b by nut 51a. Collar 106c is disposed between inside ring 53a of bearing 53 and disk plate 106*b*. Thus, input member 106 is positioned by yoke housing 52 via bearing 53 in the axial direction.

Figure 6:
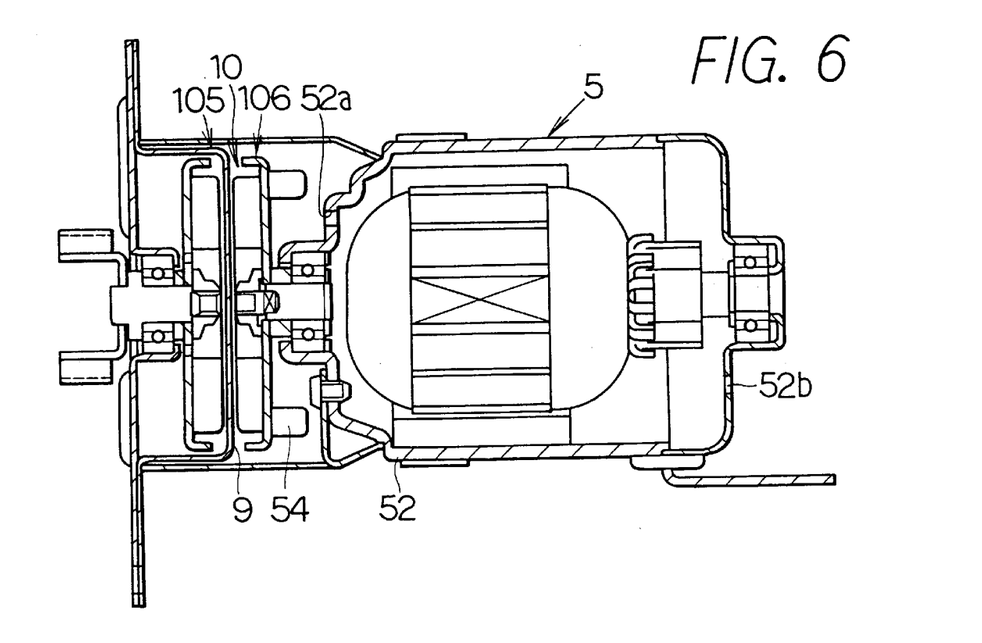
FIG. 6 is a cross-sectional view of the fan motor with the magnetic joint.

It is noted that distanced between output member 105 and input member 106 can be limited within dispersion in the sum of sizes of yoke housing 52, input member 106 and output member 105. This removes variation caused in assembling. As illustrated in FIG. 6, apertures 52*a*, 52*b* are formed at opposite end of yoke housing 52 to introduce cooling air to the inside of fan motor 5.

Case 6 has first casing 6*a*, second casing 6*b* and third casing 6*c*. First casing 6*a* has air outlet 8 disposed over secondary battery 2, as shown in FIG. 2, and accommodates secondary battery 2. Second casing 6*b* has air inlet 7 connected to the passenger compartment and a scroll portion accommodating the pair of fans 3, as shown in FIG. 2. The cooling air is supplied from the passenger compartment to secondary battery 2 by the pair of cooling fans 3 through a passage disposed under secondary battery 2 and is discharged from outlet 8 disposed over secondary battery 2. Thus, cooling air can be supplied smoothly, thereby, to cool secondary battery 2 effectively. Because the cooling air is supplied from the air-conditioned passenger compartment, the temperature of secondary battery 2 can be controlled accurately. Third casing 6*c* has a pair of small ventilation holes 11A, 11B connected to the passenger compartment by ducts or hoses 11*a*. Third casing 6*c* accommodates and holds fan motor 5 by a plurality of support members 6*e* extending inward from the inner periphery thereof. Support members 6*e* are made of resinous material and formed integrally with third casing 6*c*. Third casing 6*c* is separated by a rubber diaphragm 6*f* between ventilation holes 11A, 11B so that the cooling air introduced from ventilation hole 11A can be guided to the inside of fan motor 5. Casings 6*a*–6*c* are fastened to case 6 by bolts.

Figure 7:
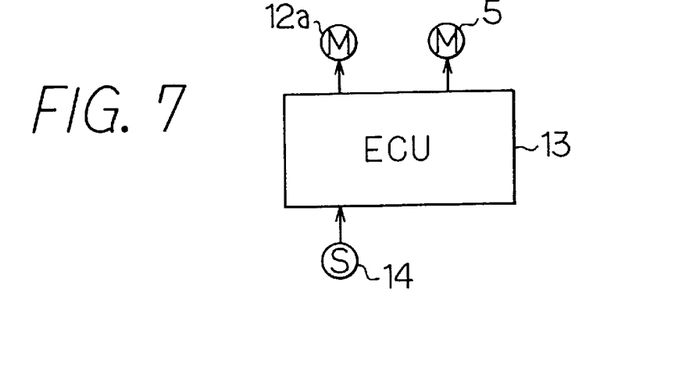
FIG. 7 is a block diagram of a control system for motors and an air-switching door.

Air switching door 12 shown in FIGS. 1 and 2 is disposed at the down stream side of air outlet 8. Air switching door 12 is driven by servomotor 12*a* shown in FIG. 7 that is controlled by ECU 13 to connect air outlet 8 to the outside of the car or the trunk room of the car. Temperature sensor 14 is disposed on secondary battery 2 and connected to ECU 13. ECU 13 increases the voltage applied to fan motor 5 as the temperature of secondary battery 2 rises, thereby increasing quantity of cooling air. ECU 13 controls servomotor 12*a* so that air switching door 12 connects outlet 8 to the trunk room when the temperature of secondary batter 2 is lower than a certain value. This saves air conditioning power. On the other hand, ECU 13 controls servomotor 12*a* so that air switching door 12 connects outlet 8 to the outside of the car when the temperature rises higher than the certain value.

Figure 8:
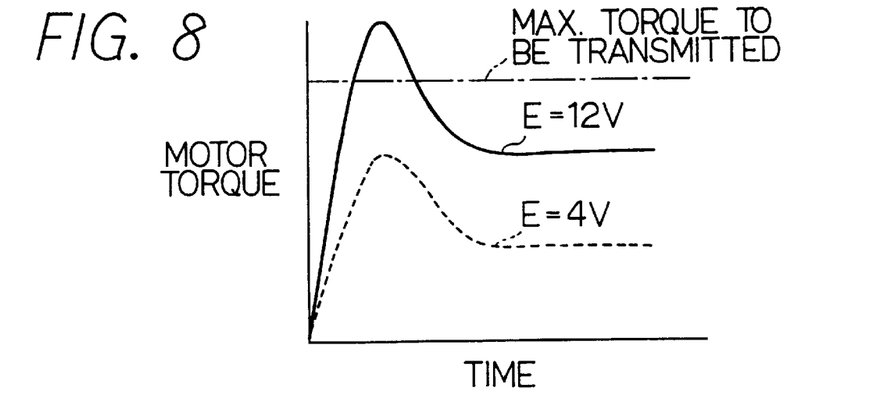
FIG. 8 is a graph showing a characteristic of transmitting torque of the magnetic joint.
Figure 9:
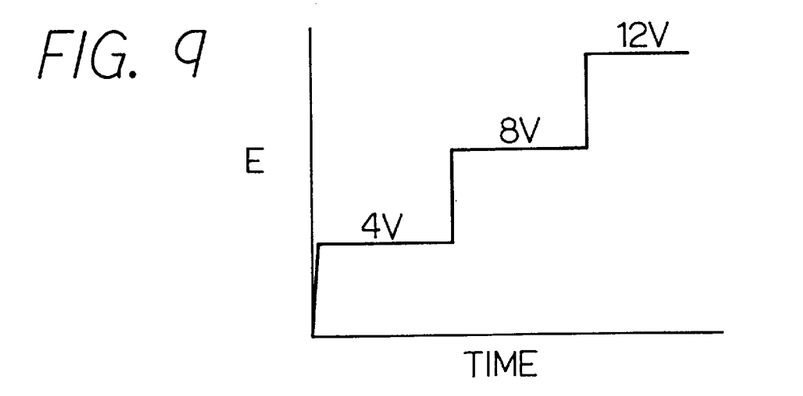
FIG. 9 is a graph showing voltage applied to the fan motor.
Figure 10:
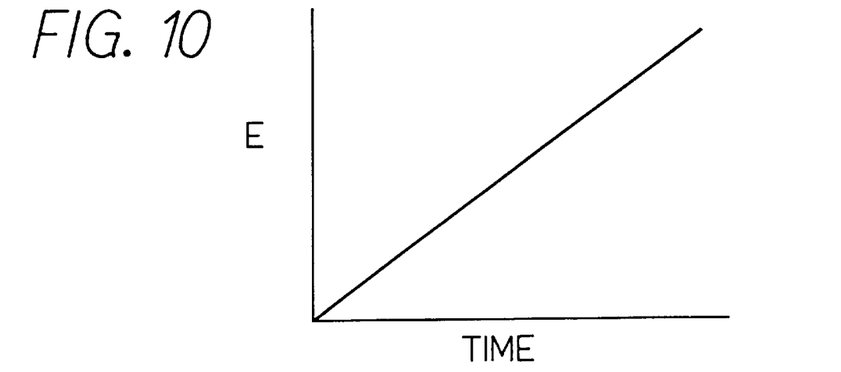
FIG. 10 is a graph showing voltage applied to the fan motor.

The input voltage E of fan motor 5 is controlled to gradually increase stepwise or straight with time as shown in FIGS. 9 and 10, so that input member 106 and output member can transmit motor torque effectively to output shaft 15 as shown in FIG. 8.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An electric power unit disposed in an electric car having a passenger compartment and a trunk room, said electric power unit comprising:
    a secondary battery;
    a pair of cooling fans for cooling said secondary battery;
    a fan motor for driving said pair of cooling fans; and
    a battery case having an air inlet and an air outlet for accommodating said secondary battery, said cooling fan and said fan motor, wherein
    said battery case has a partition for interrupting transmission of heat from said secondary battery and of dust from said cooling fan to said fan motor, wherein
    said air inlet is connected to said passenger compartment, and, wherein
    said air outlet is selectively connected to said trunk room.

2. The electric power unit as claimed in claim 1, further comprising a magnetic joint disposed between said fan motor and said pair of cooling fans.

3. The electric power unit as claimed in claim 2, wherein said magnetic joint comprises:
    an input member having a plurality of permanent magnet members, said input member being connected to said fan motor, and an output member having a plurality of permanent magnets disposed opposite said plurality of permanent magnets of said input member, said output member being connected to said pair of cooling fans, and wherein
    said partition is disposed between said input member and said output member.

4. The electric power unit as claimed in claim 3, wherein said pair of cooling fans, said magnetic joint, and said fan motor are linked in a line transverse to said electric car.

5. An electric power unit disposed in an electric car having a passenger compartment and a trunk room, said electric power unit comprising:
    a secondary battery;
    a cooling fan for cooling said secondary battery;
    a fan motor for driving said cooling fan; and
    a battery case having an air inlet and an air outlet for accommodating said secondary battery, said cooling fan and said fan motor, wherein
    said battery case has a partition for interrupting transmission of heat from said secondary battery and dust from said cooling fan to said fan motor, wherein said air inlet is connected to said passenger compartment, and, wherein said air outlet is selectively connected to said trunk room.

* * * * *

UNITED STATES PATENT AND TRADEMARK OFFICE
CERTIFICATE OF CORRECTION

PATENT NO.     : 6,220,383 B1
DATED          : April 24, 2001
INVENTOR(S)    : Muraki et al.

Page 1 of 1

It is certified that error appears in the above-identified patent and that said Letters Patent is hereby corrected as shown below:

<u>Title page,</u>
Item [73] Assignees, change "Denso Corporation; Asmo Co., Ltd., both of Kariya (JP)" to -- Denso Corporation, Kariya (JP); Asmo Co., Ltd., Kosai-city (JP) --

Signed and Sealed this

Twenty-eighth Day of May, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,220,383 B1
DATED         : April 24, 2001
INVENTOR(S)   : Muraki et al.

It is certified that error appears in the above-identified patent and that said Letters Patent is hereby corrected as shown below:

Title page,
Item [73], please change "Denso Corporation; Asmo Co., Ltd., both of Kariya (JP)" to -- Denso Corporation, Kariya (JP); Asmo Co., Ltd., Kosai-city (JP) --

Signed and Sealed this

Third Day of December, 2002

JAMES E. ROGAN
*Director of the United States Patent and Trademark Office*